United States Patent
Choi et al.

(10) Patent No.: US 11,424,499 B2
(45) Date of Patent: Aug. 23, 2022

(54) BATTERY CASING FOR VEHICLE

(71) Applicants: Hyundai Motor Company, Seoul (KR); Kia Motors Corporation, Seoul (KR)

(72) Inventors: Yong Hwan Choi, Seoul (KR); Gyung Hoon Shin, Seoul (KR); Ji Woong Jung, Gyeonggi-so (KR); Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 16/673,379

(22) Filed: Nov. 4, 2019

(65) Prior Publication Data

US 2020/0350522 A1    Nov. 5, 2020

(30) Foreign Application Priority Data

May 3, 2019 (KR) .......................... 10-2019-0052482

(51) Int. Cl.
| | |
|---|---|
| *H01M 10/613* | (2014.01) |
| *H01M 10/625* | (2014.01) |
| *H01M 10/6551* | (2014.01) |
| *H01M 10/66* | (2014.01) |
| *H01M 50/10* | (2021.01) |
| *H01M 50/20* | (2021.01) |

(52) U.S. Cl.
CPC ......... *H01M 50/10* (2021.01); *H01M 10/613* (2015.04); *H01M 10/625* (2015.04); *H01M 10/6551* (2015.04); *H01M 10/66* (2015.04); *H01M 50/20* (2021.01); *H01M 2220/20* (2013.01)

(58) Field of Classification Search
CPC .. H01M 50/10; H01M 10/613; H01M 10/625; H01M 10/6551; H01M 10/66; H01M 50/20; H01M 2220/20; H01M 50/24; H01M 10/6554; H01M 10/6556; H01M 10/6555; H01M 10/6568; H01M 10/6567; Y02T 10/70; Y02E 60/10; B60L 50/64
See application file for complete search history.

(56) References Cited

U.S. PATENT DOCUMENTS

| | | | |
|---|---|---|---|
| 2016/0093856 A1* | 3/2016 | DeKeuster | ............ H01M 50/20 429/156 |
| 2018/0019508 A1* | 1/2018 | Lee | ...................... H01M 10/625 |
| 2021/0296728 A1* | 9/2021 | Kim | ...................... H01M 50/231 |

FOREIGN PATENT DOCUMENTS

KR     20140044710 A     4/2014

* cited by examiner

*Primary Examiner* — Muhammad S Siddiquee
(74) *Attorney, Agent, or Firm* — Fox Rothschild LLP

(57) ABSTRACT

A battery casing for a vehicle includes: a lower panel; a sidewall member provided on an upper surface of the lower panel along a perimeter of the lower panel and configured to house battery modules in an internal space thereof; a cooling unit provided under the lower panel and joined to a lower surface of the lower panel, with a cooling channel provided in the lower panel to cool the battery modules; and a protective panel provided under the cooling unit and configured to protect the battery modules.

9 Claims, 5 Drawing Sheets

BATTERY CASING FOR VEHICLE

CROSS REFERENCE TO RELATED APPLICATION

The present application claims under 35 U.S.C. § 119(a) the benefit of Korean Patent Application No. 10-2019-0052482 filed on May 3, 2019, the entire contents of which are incorporated by reference herein.

BACKGROUND

(a) Technical Field

The present disclosure relates to a battery casing for a vehicle, more particularly, to the battery casing capable of reducing shock transmitted from the outside to the battery casing.

(b) Description of the Related Art

In recent years, environmentally-friendly vehicles have increasingly become popular due to high oil prices and carbon dioxide emission regulations that negatively affect desirability of conventional internal combustion engine vehicles. Examples of environmentally-friendly vehicles include pure electric vehicles and hybrid vehicles, where various models have been commercialized and marketed by vehicle manufacturers.

Batteries are mounted in environmentally-friendly vehicles to provide energy for driving motors. Typically a battery is installed in a lower part of a vehicle. As such, since the battery is disposed in the lower part of the vehicle, shock may be applied to the battery when the lower part of the vehicle collides with a protrusion on the road or an object while the vehicle moves. Due to this mounting arrangement, there is a problem in that an accident, etc. may occur. To overcome this problem, there is a need to reinforce a lower casing of the battery. One proposed solution involves a technique in which a lower part of the battery casing is covered with a separate protective cover. However, in this case, there are problems in that the weight of the vehicle is increased, volumetric energy density is reduced, and a battery mounting capacity is reduced.

The foregoing is intended merely to aid in the understanding of the background of the present disclosure, and is not intended to mean that the present disclosure falls within the purview of the related art that is already known to those skilled in the art.

SUMMARY

The present disclosure proposes a battery casing for a vehicle capable of reducing shock transmitted from the outside to the battery casing.

According to one aspect, there is provided a battery casing for a vehicle, including: a lower panel; a sidewall member provided on an upper surface of the lower panel along a perimeter of the lower panel and configured to house battery modules in an internal space thereof; a cooling unit provided under the lower panel and joined to a lower surface of the lower panel, with a cooling channel provided in the lower panel to cool the battery modules; and a protective panel provided under the cooling unit and configured to protect the battery modules.

At least one lateral member configured to increase lateral stiffness of the battery casing and at least one longitudinal member configured to increase longitudinal stiffness of the battery casing may be provided in the internal space of the sidewall member and disposed over the lower panel, and the battery modules may be housed between the lateral member and the longitudinal member.

A heat dissipation fin configured to dissipate heat generated from the battery modules may be disposed between the battery modules.

The heat dissipation fin may include an upper end, a central part, and a lower end.

The central part may be disposed between the battery modules, and the upper end and the lower end may be bent toward one side of the battery modules and extend in a horizontal direction.

The lower end of the heat dissipation fin may include a first horizontal part bent toward the one side of the battery modules and extending in the horizontal direction, and a second horizontal part slantly bent downward from the first horizontal part and horizontally extending from an end of the slantly bent part toward the one side of the battery modules.

The second horizontal part may extend a length greater than a length of the first horizontal part.

A plurality of junctions at which an upper surface of the cooling channel and the lower surface of the lower panel are joined to each other may be formed between the cooling channel and the lower panel.

The central part of the heat dissipation fin may be disposed between the junctions.

The cooling channel may include a plurality of arches each having a downwardly convex shape.

Each of the arches may be disposed at a position aligned with a position at which the central part of the corresponding heat dissipation fin is disposed.

The battery casing may further include a shock absorber provided on an upper surface of the protective panel and disposed under each of the junctions so that force transmitted from an outside is absorbed by the shock absorber.

The shock absorber may be formed of an elastomer.

The cooling channel may be joined to the lower surface of the lower panel, and form a closed cross-section with the lower surface of the lower panel so that a flow passage along which cooling water flows is formed, and the flow passage may be parallel to a direction in which the battery modules are oriented.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a battery casing for a vehicle in accordance with exemplary embodiments of the present disclosure will be described in detail with reference to the attached drawings.

Figure 1:
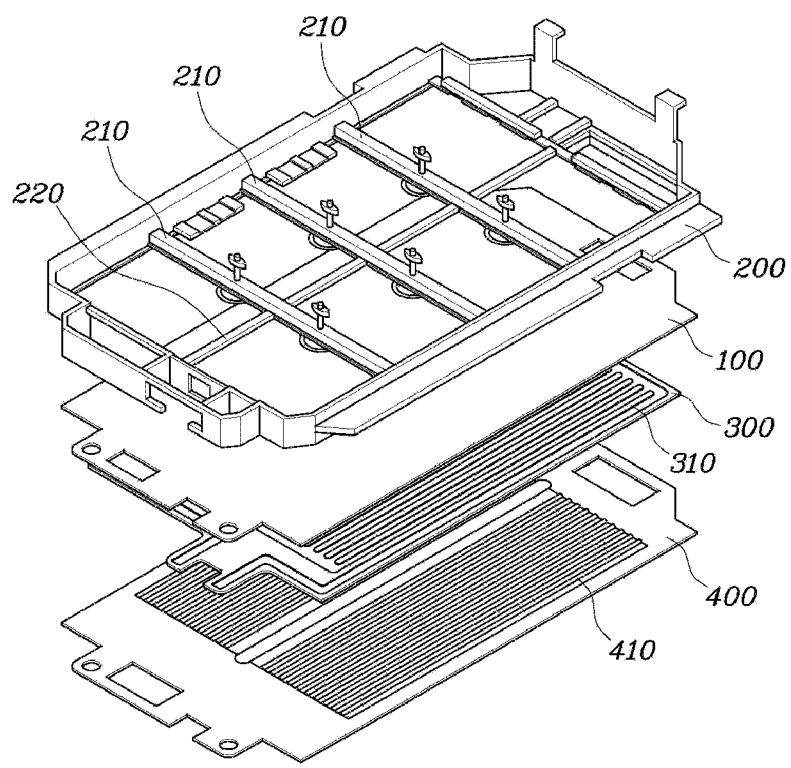
FIG. 1 is an exploded perspective view illustrating a battery casing for a vehicle in accordance with an embodiment of the present disclosure.
Figure 2:
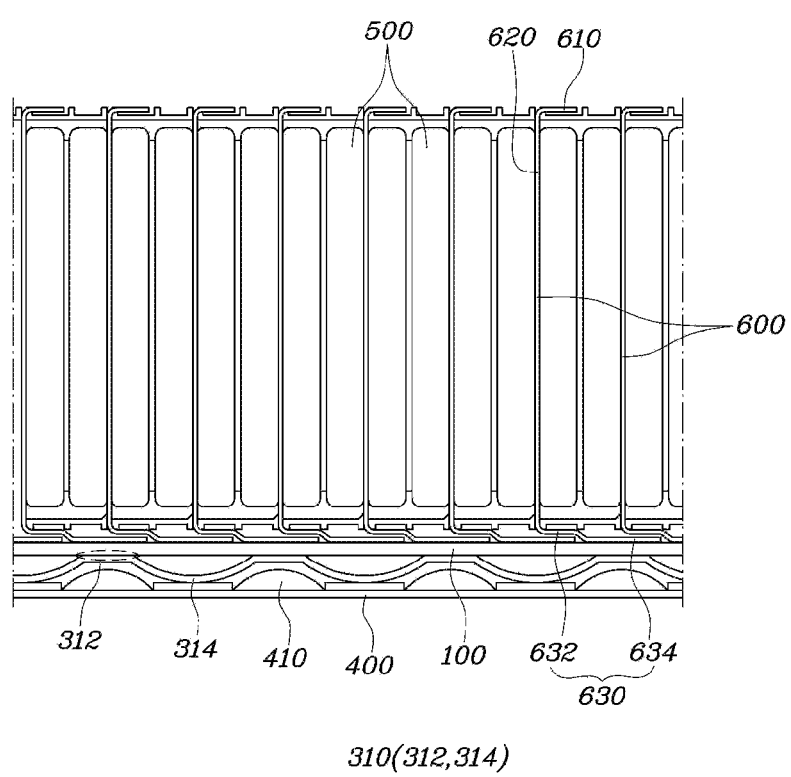
FIG. 2 is a sectional view schematically illustrating characteristics of a detailed configuration of the battery casing in accordance with an embodiment of the present disclosure.
Figure 3:
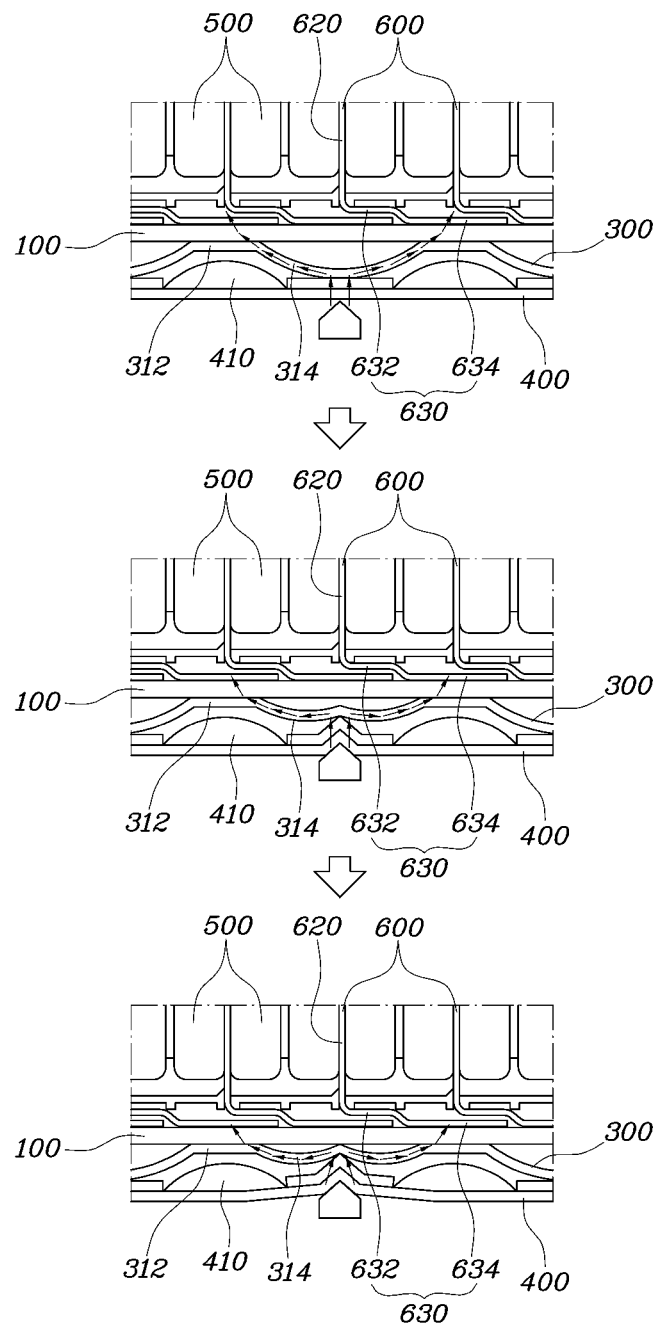
FIG. 3 illustrates a process of dispersing external shock through a cooling channel and heat dissipation fins and discharging the external shock to the outside, in the battery casing in accordance with an embodiment of the present disclosure.
Figure 4:
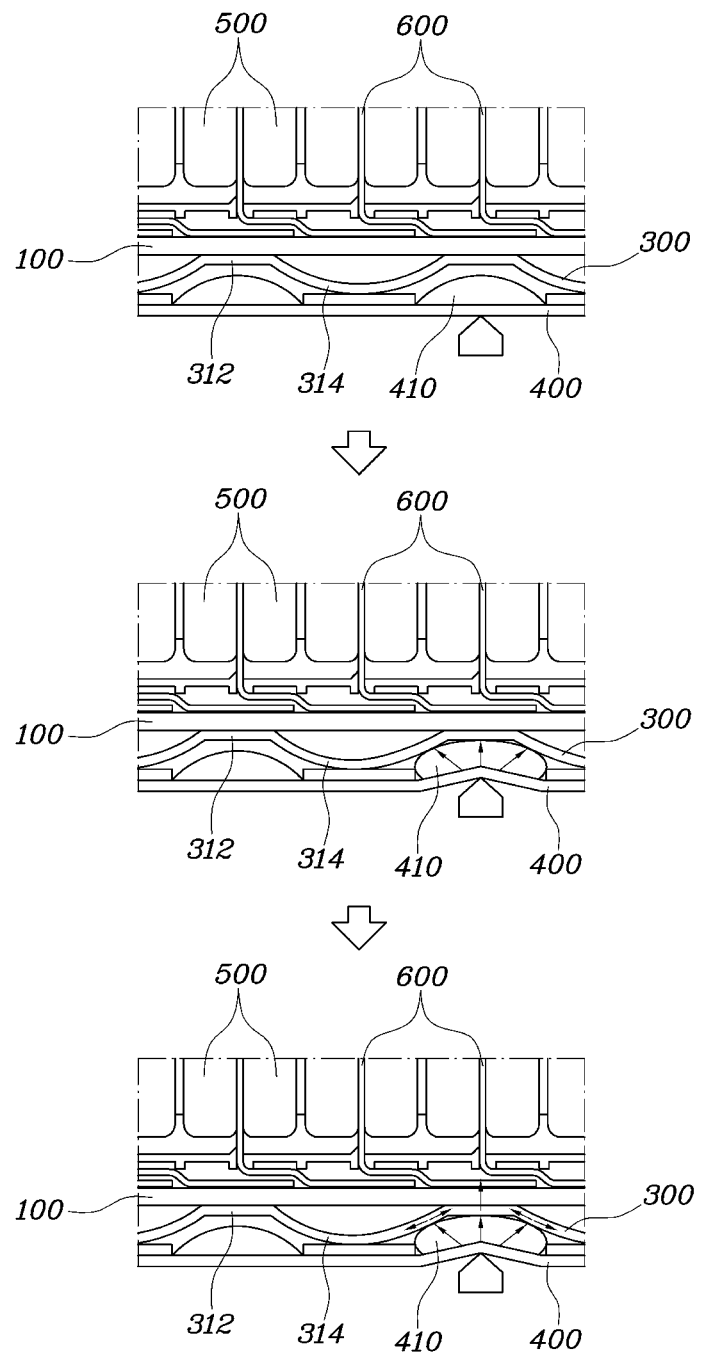
FIG. 4 illustrates a process of dispersing external shock through a shock absorber and heat dissipation fins and discharging the external shock to the outside, in the battery casing in accordance with an embodiment of the present disclosure.

FIG. 1 is an exploded perspective view illustrating a battery casing for a vehicle in accordance with an embodiment of the present disclosure. FIG. 2 is a sectional view schematically illustrating characteristics of a detailed configuration of the battery casing in accordance with an embodiment of the present disclosure. FIG. 3 illustrates a process of dispersing external shock through a cooling channel and heat dissipation fins and discharging the external shock to the outside, in the battery casing in accordance with an embodiment of the present disclosure. FIG. 4 illustrates a process of dispersing external shock through a shock absorber and heat dissipation fins and discharging the external shock to the outside, in the battery casing in accordance with an embodiment of the present disclosure.

As illustrated in FIG. 1, the battery casing in accordance with an embodiment of the present disclosure may include a lower panel 100, a sidewall member 200, a cooling unit 300, and a protective panel 400.

The lower panel 100 may have a flat panel shape. Depending on the embodiment, the lower panel 100 may be formed of aluminum. Although in this embodiment aluminum is used as a material only for reducing the weight of the entire battery casing by reducing the weight of the lower panel 100, various materials such as aluminum may be used to form the lower panel 100.

The sidewall member 200 may be provided on an upper surface of the lower panel 100 along the perimeter of the lower panel 100 and house battery modules 500 in an internal space thereof.

In particular, disposed over the lower panel 100, at least one lateral member 210 for enhancing the lateral stiffness of the batter casing and at least one longitudinal member 220 for enhancing the longitudinal stiffness of the battery casing may be provided in the internal space of the sidewall member 200. The battery modules 500 may be housed in space defined between the lateral member 210 and the longitudinal member 220. In an embodiment, the lateral member 210 and the longitudinal member 220 may be formed of aluminum to reduce the weight of the battery casing. However, this is only an embodiment, and various materials such as aluminum may be used to form the lateral member 210 and the longitudinal member 220.

The cooling unit 300 is provided under the lower panel 100 and functions to cool the battery modules 500. A cooling channel 410 may be formed in the cooling unit 300 so that cooling water for cooling the battery modules 500 flows through the cooling channel 410. The cooling unit 300 may be joined to a lower surface of the lower panel 100. Here, the cooling channel 410 is joined to the lower surface of the lower panel 100, and forms a closed cross-section with the lower surface of the lower panel 100, thus forming a flow passage along which the cooling water flows. The flow passage may be parallel to a direction in which the battery modules 500 are oriented, whereby cooling water may flow in one direction through the corresponding flow passage.

In other words, in the battery casing in accordance with the present disclosure, the battery casing and the cooling unit including the cooling channel for cooling the battery are integrally formed with each other rather than being separately formed. Hence, the volume of an entire battery system may be reduced, and the weight of the entire vehicle may be reduced.

In particular, the cooling channel 310 may include a plurality of arches 314 each having a downwardly convex shape. In an embodiment, each of the arches 314 may be formed at a position aligned with a position of a central part 620 of a heat dissipation fin, which will be described below.

In addition, a plurality of junctions 312 at which an upper surface of the cooling channel 310 and the lower surface of the lower panel 100 are joined to each other may be formed between the cooling channel 310 and the lower panel 100. In an embodiment, the central part 620 of each heat dissipation pin 600, which will described below, may be disposed between corresponding adjacent junctions 312.

As such, according to the present disclosure, the central part 620 of each heat dissipation fin 600 is disposed between the corresponding adjacent junctions 312. Hence, as illustrated in FIG. 3, when external force is transmitted to the arch 314 of the battery casing, the force may be primarily dispersed due to structural characteristics of the arch 314, and the dispersed force is discharged to the outside through the central part 620 of the heat dissipation fin. Thereby, external shock may be prevented from being transmitted to the battery modules 500.

Moreover, with regard to the size of the arch 314 of the cooling channel 310, a width L of the arch 314 is greater than a distance H between a lowermost end of the cooling channel 310 and the lower panel 100. In an embodiment, H may be ⅓ or more of L.

As illustrated in FIG. 3, heat dissipation pins 600 may be disposed between the battery modules 500 to dissipate heat generated from the battery modules 500. In particular, each of the dissipation fins 600 may include an upper end 610, a central part 620, and a lower end 630. Here, the central part 620 may be inserted into a space between the corresponding battery modules 500. The upper end 610 and the lower end 630 may be bent toward one side of the battery modules 500 and extend in a horizontal direction.

In particular, the lower end 630 of the heat dissipation fin 600 may include a first horizontal part 632 which is bent toward the one side of the battery modules 500 and extends in the horizontal direction, and a second horizontal part 634 which is slantly bent downward from the first horizontal part 632 and horizontally extends from an end of the slantly bent part toward the one side of the battery modules 500. In an embodiment, a length to which the second horizontal part 634 extends is greater than a length to which the first horizontal part 632 extends.

The protective panel 400 is provided under the cooling unit 300 and functions to protect the battery modules 500. In particular, a shock absorber 410 may be provided on an upper surface of the protective panel 400 to absorb force transmitted from the outside to the batter casing. Here, as illustrated in FIG. 4, the shock absorber 410 may be provided under the junctions 312 formed by joining the upper surface of the cooling channel 310 to the lower surface of the lower panel 100. In an embodiment, the shock absorber 410 may be formed of an elastomer.

In particular, with regard to the function of the shock absorber 410, when an external shock is applied to the battery casing, as illustrated in FIG. 4, the shock absorber 410 may prevent stress from being concentrated on one portion, and disperse the external force. The dispersed force is discharged to the outside through the heat dissipation fins 600. In this way, the shock absorber 410 may prevent the external shock from being transmitted to the battery modules 500.

Each battery module 500 may be a high-voltage battery which is mounted in an environmentally-friendly vehicle, and may function to provide power to a drive unit, e.g., a motor, for driving the vehicle. As illustrated in FIG. 2, heat dissipation pins 600 may be disposed between the battery modules 500 to dissipate heat generated from the battery modules 500. In particular, the second horizontal part 634 of the lower end of each heat dissipation pin 600 comes into contact with the upper surface of the lower panel 100 that is joined to the cooling channel 310, so that the second horizontal part 634 may be cooled by cooling water flowing through the cooling channel 310, thus cooling the corresponding battery module 500. In addition, the heat dissipation fins 600 are preferably made of material having high thermal conductivity.

Figure 5:
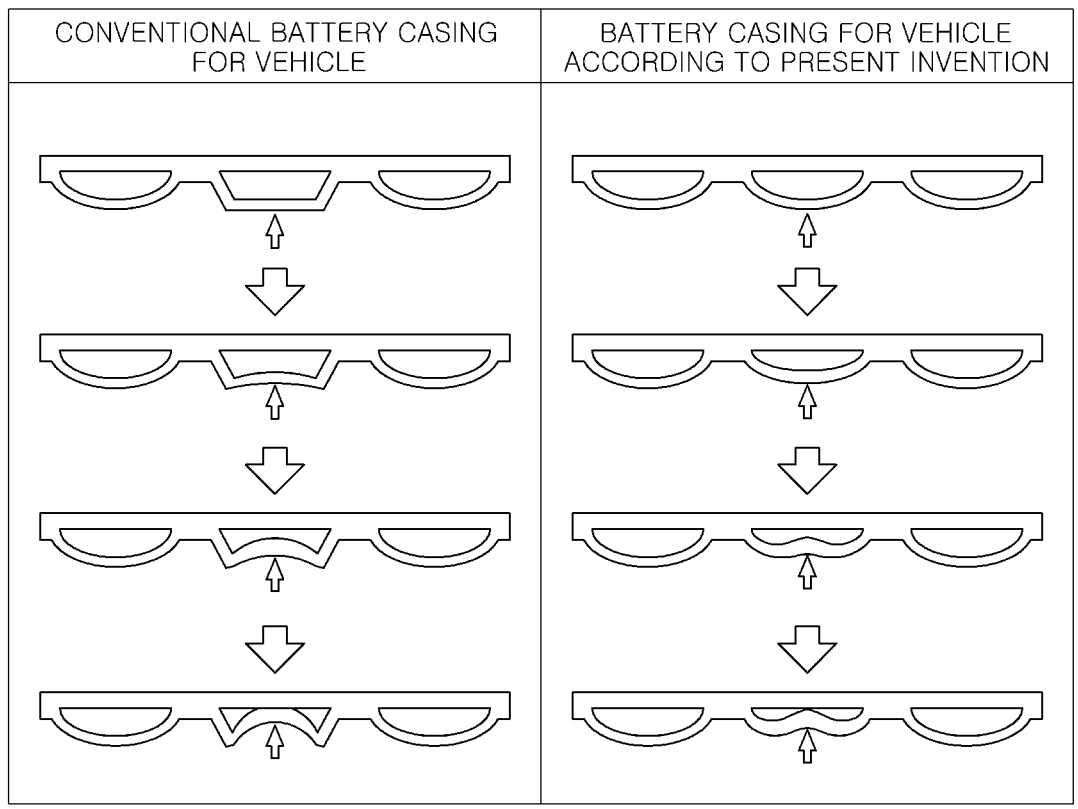
FIG. 5 is a diagram illustrating effects of dispersing external shock when the same external shock is applied to a conventional battery casing and the battery casing in accordance with an embodiment of the present disclosure.

FIG. 5 is a diagram illustrating effects of dispersing external shock when the same external shock is applied to a conventional battery casing and the battery casing in accordance with an embodiment of the present disclosure. Referring to FIG. 5, as shown in the description of the battery casing in accordance with an embodiment of the present disclosure, in the case where the cooling unit has arches, when an external shock is applied to the battery casing, the arches may disperse the shock and prevent the shock from being directly transmitted to the battery modules, thus enhancing the stability of the battery.

As described above, in a battery casing in accordance with the present disclosure, when force is transmitted from the outside to the battery casing, the force may be primarily dispersed due to structure characteristics of arches. The dispersed force may be discharged to the outside through central parts of heat dissipation fins. Thereby, the amount of shock which is transmitted to battery modules may be reduced. Consequently, the stability of the battery modules may be enhanced.

Although embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A battery casing for a vehicle, comprising:
   a lower panel;
   a sidewall member provided on an upper surface of the lower panel along a perimeter of the lower panel and configured to house battery modules in an internal space thereof;
   a cooling unit provided under the lower panel and joined to a lower surface of the lower panel, with a cooling channel provided in the lower panel to cool the battery modules; and
   a protective panel provided under the cooling unit and configured to protect the battery modules,
   a heat dissipation fin configured to dissipate heat generated from the battery modules and disposed between the battery modules, wherein the heat dissipation fin includes an upper end, a central part, and a lower end, and wherein the central part is disposed between the battery modules,
   wherein the cooling channel includes a plurality of arches each having a downwardly convex shape, wherein each of the arches has a first end portion, a center portion and a second end portion which are respectively disposed at a position aligned with a position at which the central part of the corresponding heat dissipation fin is disposed.

2. The battery casing of claim 1, wherein at least one lateral member configured to increase lateral stiffness of the battery casing and at least one longitudinal member configured to increase longitudinal stiffness of the battery casing are provided in the internal space of the sidewall member and disposed over the lower panel, and the battery modules are housed between the lateral member and the longitudinal member.

3. The battery casing of claim 1, wherein the upper end and the lower end are bent toward one side of the battery modules and extend in a horizontal direction.

4. The battery casing of claim 3, wherein the lower end of the heat dissipation fin includes a first horizontal part bent toward the one side of the battery modules and extending in the horizontal direction, and a second horizontal part slantly bent downward from the first horizontal part and horizontally extending from an end of the slantly bent part toward the one side of the battery modules.

5. The battery casing of claim 4, wherein the second horizontal part extends a length greater than a length of the first horizontal part.

6. The battery casing of claim 4, wherein a plurality of junctions at which an upper surface of the cooling channel and the lower surface of the lower panel are joined to each other are formed between the cooling channel and the lower panel, and wherein the central part of the heat dissipation fin is disposed between the junctions.

7. The battery casing of claim 6, further comprising a shock absorber provided on an upper surface of the protective panel and disposed under each of the junctions so that force transmitted from an outside is absorbed by the shock absorber.

8. The battery casing of claim 7, wherein the shock absorber is formed of an elastomer.

9. The battery casing of claim 1, wherein the cooling channel is joined to the lower surface of the lower panel, and forms a closed cross-section with the lower surface of the lower panel so that a flow passage along which cooling water flows is formed, and the flow passage is parallel to a direction in which the battery modules are oriented.

* * * * *